United States Patent [19]
Curtis

[11] 3,939,894
[45] Feb. 24, 1976

[54] VALVE STEM LOCK
[75] Inventor: H. James Curtis, Miami, Fla.
[73] Assignee: Ryder Truck Rental, Inc., Miami, Fla.
[22] Filed: Oct. 23, 1974
[21] Appl. No.: 517,248

[52] U.S. Cl. ................................. 152/427; 85/36
[51] Int. Cl.² ..................................... B60C 29/00
[58] Field of Search .................. 152/415, 427, 428; 239/588; 222/530; 85/36

[56] References Cited
UNITED STATES PATENTS
| | | | |
|---|---|---|---|
| 3,106,953 | 10/1963 | Baxa | 152/427 |
| 3,464,309 | 9/1969 | Kilmarx | 85/36 |
| 3,699,840 | 10/1972 | Cook | 85/36 |

Primary Examiner—Drayton E. Hoffman
Assistant Examiner—Norman L. Stack, Jr.
Attorney, Agent, or Firm—Watson, Cole, Grindle & Watson

[57] ABSTRACT

A valve stem lock for motor vehicle tires comprises a plate member having a forked end for surrounding the base of the stem, and having a flange perpendicular to the plate formed with opposing pairs of locking projections for clamping onto a portion of the stem. One pair of the locking projections lies in the plane of the flange, and the other pair thereof is formed on a spring finger which extends toward the one pair of projections.

9 Claims, 5 Drawing Figures

VALVE STEM LOCK

BACKGROUND OF THE INVENTION

1. Field of the Invention

This invention relates generally to motor vehicle wheels, and more particularly to a lock for the wheel valve stem.

2. Description of the Prior Art.

In each of the following patents,

U.S. Pat. No. 2,984,283 to Ransom issued May 16, 1971,

U.S. Pat. No. 3,039,510 to Cardi issued June 19, 1962,

U.S. Pat. No. 1,069,953 to Baxa issued Oct. 15, 1963, various types of clips or holder means are provided for preventing the tire valve stem of motor vehicle tires from pulling through the wheel into the tire and thus preventing damage to the tire interior upon deflation of the tire. It is known that, when a tire becomes deflated, the valve stem is pulled through the wheel inside the tire and oftentimes renders the tire useless if the valve stem revolves about and lacerates the inside of the tire. Several approaches have therefore been taken, as shown by the above prior art patents, in retaining the valve stem outside the wheel rim to avoid its being pulled through the inside of the tire upon deflation. However, these prior art valve stem holders or clamps are of a relatively complex construction and are therefore not made available for widespread economic use. Moreover, the holders have been found to ineffectively clamp the valve stem for preventing it from being pulled through the wheel into the tire and, most importantly, these prior art valve stem holders are incapable of being effectively used over and over again since the means used in clamping the holder in place is oftentimes distorted after first use. Reference is made specifically to the Ransom patent wherein an opposing pair of spring fingers having notches at their ends are used in clamping the holder in place on the valve stem.

SUMMARY OF THE INVENTION

The present invention relates to a valve stem lock or holder for motor vehicle tires, such lock being designed to engage the valve stem in such a manner as to effectively prevent it from being pulled through the wheel and into the tire. The lock is of simple construction and is easy to install, completely reliable and easy to remove for repeated subsequent use for locking the valve stem in place as effectively as for the first use. Such is the principal object of the invention.

Another object is to provide such a valve stem lock for motor vehicle tires wherein locking projections are integrally formed and are coplanar with a transversely extending flange of the holder, other opposed locking projections being located at the free end of a spring finger, the projections cooperating together for engaging the valve stem to clamp the holder in place. Movement of the spring finger in a direction opposite its holding direction relieves the clamping force against the valve stem so that the lock may be removed without the use of any tools.

Another object of this invention is to provide such a valve stem lock wherein the locking projections on both the flanage and the spring finger are defined by the opposite ends of circular arcs each of which are non-concentric to the central axis of the opening defined therebetween.

Other objects, advantages and novel features of the invention will become more apparent from the following detailed description of the invention when taken in conjunction with the accompanying drawings.

DESCRIPTION OF THE PREFERRED EMBODIMENT

Figure 1:
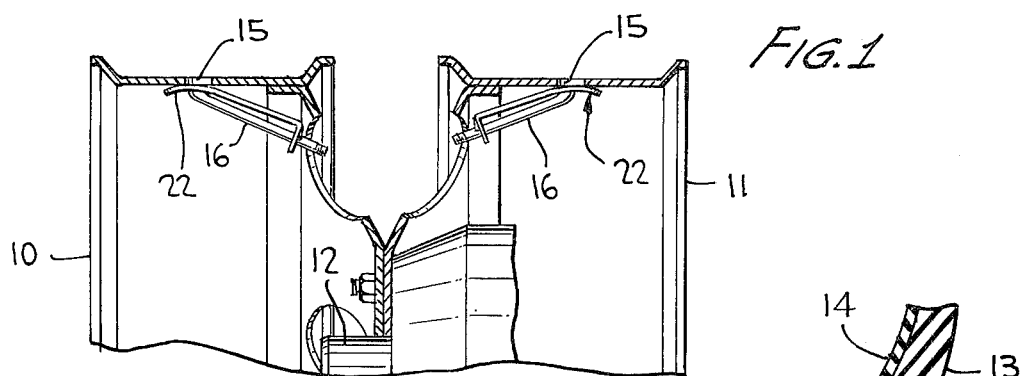
FIG. 1 is an elevational view showing a part of a dual wheel assembly with the tires omitted for clarity and the valve stem locks shown secured in place.

In the drawings, wherein like reference characters refer to like and corresponding parts throughout the several views, a dual wheel assembly is partially shown in FIG. 1 as comprising wheel rims 10 and 11 interconnected in the normal manner with the outer wheel mounted on a wheel hub 12. As shown more clearly in FIG. 2, and being omitted in FIG. 1 for the sake of clarity, wheel rim 11 typically carries a tire 13 inflated by means of a tire tube 14. Of course, a similar tire and tube are carried by inner wheel 10. Each wheel rim has a slot 15 therein through which an L-shaped tire valve stem 16 extends in the normal manner. Also, the valve stem is connected to tube 14 at the air passageway 17 thereof to facilitate inflation of the tire. The valve stem includes a generally vertical portion 18 which extends into opening 15, and an integrally connected horizontal portion 17 which may be capped at its free threaded end 21.

Figure 2:
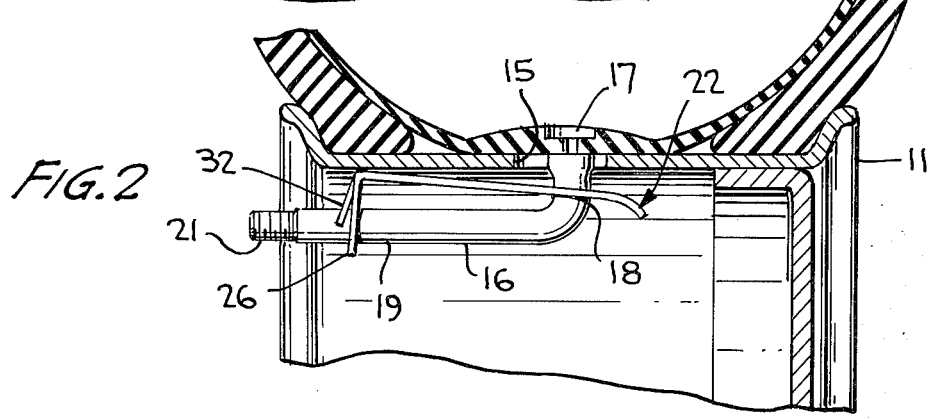
FIG. 2 is a view similar to FIG. 1 except that a single wheel and part of a tire mounted thereto are shown at an enlarged scale.
Figure 3:
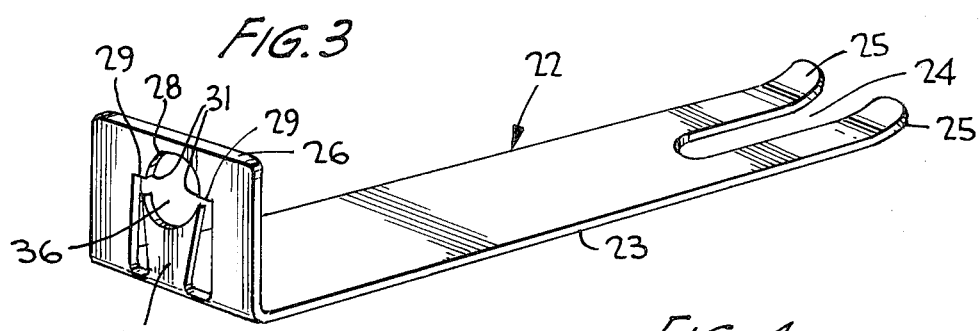
FIG. 3 is a perspective view of the valve stem lock in accordance with the invention.
Figure 4:
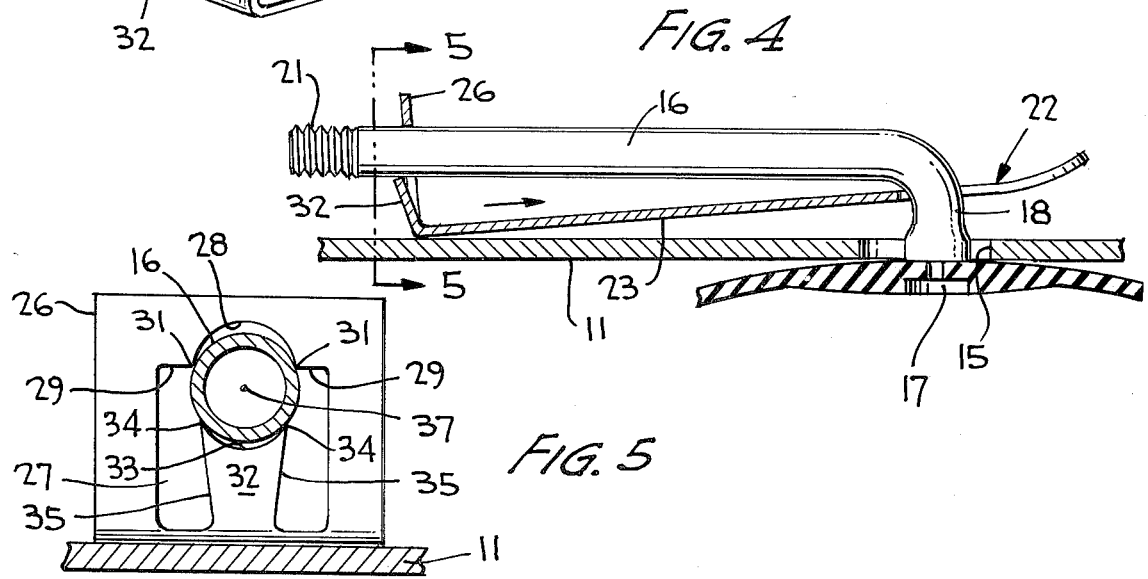
FIG. 4 is a side elevational view showing the valve stem lock of the invention clamped in place on the valve stem, at a slightly enlarged scale as compared to FIG. 2.
Figure 5:
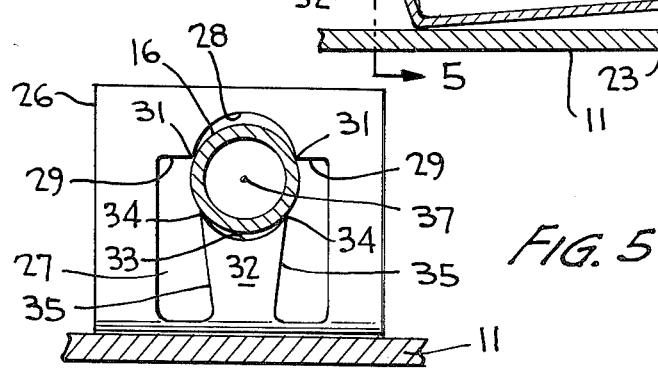
FIG. 5 is a sectional view taken along the line 5—5 of FIG. 4 showing the valve stem holder in engagement with the valve stem.

The valve stem holder of the invention, generally designated 22, and shown in FIG. 3, is shown mounted in place in FIGS. 2 and 4 between the valve stem and the wheel rim and in engagement with the valve stem. The lock or holder 22 comprises a flat plate member 23 which may be of spring metal having a forked end defined by an open slot 24. The legs 25 at this forked end are slightly turned at their outer ends to facilitate easy installation of the valve stem lock. A transversely extending flange 26 is provided on flat plate 23 and lies in a plane substantially perpendicular thereto. Plate 26 has a cutout portion 27 therein which, as shown in FIG. 5, is partially defined by a downwardly opening circular arc edge 28. Horizontal edges 29 extend outwardly of the opposite ends of arc 28 so as to define locking projections 31 lying in the plane of the flange.

A spring finger 32 is formed in the flange and is coplanar therewith when initially made. The spring finger extends toward edge 28, and its free end is formed as having a circular arc edge 33 defining another pair of locking projections 34 at the opposite ends of this arc edge togehter with side edges 35 of the spring finger.

Arc edges 28 and 33 are spaced apart to define an opening 36 having a central point 37. The longitudianl axis of cylindrical valve stem 16 coincides with this point when the valve stem lock is mounted in place. Also, the circular arcs defining edges 28 and 33 are not concentric with this central point for a purpose to be discussed more fully hereinafter.

The valve stem is easily installed by moving it in the direction of the arrow of FIG. 4 such that the legs at the forked end thereof engage the opposite sides of vertical portion 18 of the stem. During installation of the valve stem holder, the horizontal portion 19 of the valve stem is made to extend through opening 36 of the flange and, since the size of opening 36 is slightly less than the valve stem diameter, spring finger 32 is sprung slightly outwardly of the flange by the valve stem until the forked end comes to rest at vertical portion 18 as shwon in the drawing. The spring finger is thereupon biased against the valve stem in its position of FIGS. 2 and 4, and locking projections 31 and 34 engage the valve stem as in the manner of FIG. 5 to clamp the valve stem holder securely in place thereon. By reason of the single spring finger having its locking projections 34 bearing against the valve stem out of the plane of flange 26 and its locking projections 31, the valve stem lock will assume a position when completely installed whereby it plate member 23 is urged away from the wheel rim in the position of FIGS. 2 and 4. Accordingly, the inner edge of open slot 24 bears against the bent portion of the valve stem as the locking projections bear against horizontal portion 19. Also, the width of the spring finger at its base is less than the width at its free end. Side edges 35 therefore diverge from the base. With such design, the spring finger is rendered more flexible and is therefore more likely to spring back toward the flange after lock is removed.

Valve stem locks in accordance with the invention may easily be installed on each of the motor vehicle wheels with one hand and without the need for tools of any kind. Such valve stem locks may likewise be easily installed for valve stems of inner wheels such as 10 of the dual wheel assembly in a similar manner.

As described above, the stem receiving opening 36 of the valve lock is partially defined by a rigid arcuate edge 28 which opens downwardly and is non-concentric with central point 37 of the opening. Locking projections 31 are thereby formed together with edges 29 of the cutout. Arcuate edge 33 opens upwardly toward the valve stem and is non-concentric with the central point of the opening. This edge defines locking projections 34 together with side edges 35. However, these locking projections are formed on spring finger 32 which is capable of shifting out of the plane of the flange upon installation. The opposing forces of the locking projections against the valve stem are are therefore dependent on the particular angle of the spring finger relative to the flange as well as dependent on the size of the arc edges. The locking effect achieved with such design is unlike that of a pair of spring fingers having simple notches therein for engaging the valve stem as in the manner shown for example in the Ransom patent. These upset spring fingers are cut in such a manner as to form a helix as if to accept a threaded fastener. The present invention departs from such an approach and provides the necessary holding action and furthermore permits easy removal of the lock by a non-concentric and a non-helical design of the means used in locking the valve lock in place.

With the use of a single spring finger the spring effect, as compared to that of the opposing fingers as in the prior art, is not compromised during the removal of the present valve lock. The single finger of the presently devised valve lock may be tilted or relieved in a direction opposite its holding direction so as to relieve the force of its locking projections on the valve stem. The valve lock may thereafter be removed without the need for tools by, for example, simply urging flat plate member 23 with one hand toward the valve stem so as to slightly bend the flat plate portion of the holder to thereby relieve the force of the spring finger locking projections. Since the valve lock is of spring metal removal is easy and repeated use of the same valve lock is made possible.

On the other hand, with a pair of spring fingers used in clamping an object onto a cylindrical member, the twin fingers take the path of least resistance when an object is pushed therethrough and the fingers line themselves up in an offsetting relationship. Therefore, removal of the valve holder is difficult even with the use of tools and, even if successfully removed, the valve holder is not effectively available for subsequent use. In the present invention, on the other hand, the use of locking projections on a single spring finger in cooperation with locking projections which are rigid, no opposing helical form counters entry of the object such as the valve stem. The clamping form is along a straight line which straight line action prevails for both opening and closing of the clamping effect on the valve stem so that multi-use of the valve lock is made possible. This positive holding feature is due to the rigid portion of the locking projections.

The present lock or holder is available not only for valve stems of motor vehicle tires but also for example in the construction industry. Concrete reinforcing bars could be clamped in place during the concrete pouring operation and until the concrete has cured. Also, repeated use of the holders renders them highly economical and available for widespread use such as cable handling and the like.

Obviously, many modifications and variations of the present invention are possible in the light of the above teachings. It is therefore to be understood that within the scope of the appended claims the invention may be practiced otherwise than as specifically described.

What is claimed is:

1. A valve stem lock for motor vehicle tire, comprising a flat plate member of springy material having an open slot at one end for embracing the valve stem, a transverse rigid flange on said plate member extending perpendicular thereto, said flange having an opening through which the valve stem extends, opposing pairs of locking projections on said flange extending into said opening, one pair of said locking projections defining a portion of said opening, a portion of said flange defining a spring finger member connected at its base, the other pair of said locking projections being located at the free end of said spring finger member, whereby during installation of said plate member wherein said opening surrounds the valve stem and said slot embraces the valve stem, said spring finger is shifted outwardly of said flange for spring locking said plate member to the valve stem as said locking projections engage the valve stem, and whereby said locking projections may be disengaged from the valve stem as said plate member is spring bent toward the valve stem thereby causing said flange to shift therealong.

2. The valve stem according to claim 1, wherein the valve stem is cylindrical and wherein said pairs of said opposing locking projections are respectively defined by circular arc segments each being non-concentric with a central point of said opening.

3. The valve stem according to claim 1, wherein said plate member is of spring metal.

4. The valve stem according to claim 1, wherein the width of said base of said spring finger is less than the width of said free end thereof.

5. In an arrangement of a support member having an opening through which a cylindrical member extends outwardly of one side thereof, an element bearing against the opposite side of said flat support member, said cylindrical member being connected to said element, a lock member for retaining said cylindrical member outwardly of said one side of said support member, said lock member comprising a flat plate member of spring material having a forked end defined by an open slot for engagement with said cylindrical member, a transverse rigid flange element on said plate member extending perpendicularly thereto, an opening in said flange element, a first pair of locking projections on said flange element extending into said opening, said locking projections lying wholly within the plane of said flange element and defining a portion of said opening, a spring finger member on said plate member extending in the same direction as said flange element, a second pair of locking projections located at the free end of said spring finger member and extending into said opening, said first and second locking projections being adapted for engagement of said cylinder member when it extends through said opening for spring locking said plate member to the cylindrical member, said plate member being releasable from the valve stem as said plate member is spring bent toward the valve stem thereby causing said flange to shift therealong.

6. The lock member according to claim 5, wherein said opening has a central point and is defined by circular arcs respectively in said flange element and at said free end of said spring finger, said arcs being non-concentric with said central point, and said first and second locking projections lying at the opposite ends of said arcs, respectively.

7. The lock member according to claim 5, wherein said plate member is of spring metal.

8. The lock member according to claim 5, wherein the width of said spring finger at its base is less than the width thereof at said free end.

9. A valve stem lock for motor vehicle tires, comprising a flat plate member of spring metal having a forked end defined by an open slot, a transverse rigid flange element on said plate member and extending perpendicularly thereto, a cutout portion in said flange element defined partially by a first circular arc and shoulders at the opposite ends thereof presenting a first pair of locking projections coplanar with said flange, the lock further comprising a spring finger member extending toward said locking projections, the free end of said spring finger member being formed as a second circular arc presenting a second pair of locking projections at the opposite ends thereof facing said first locking projections, whereby said plate member is capable of being locked onto the valve stem as its cutout portion surrounds the valve stem and its open slot embraces the valve stem, said spring finger member being shifted outwardly of said flange for spring locking said plate member to the valve stem as said locking projections engage the valve stem, and whereby said locking projections may be disengaged from the valve stem as said plate member is spring bent toward the valve stem thereby causing said flange to shift therealong.

* * * * *